United States Patent
Lagarejo Lloreda et al.

(10) Patent No.: US 12,486,946 B2
(45) Date of Patent: Dec. 2, 2025

(54) SYSTEM AND METHOD FOR MONITORING AND CONTROL OF STEAM LOST FROM STEAM TRAPS

(71) Applicant: ZION ING S.A.S., Pereira (CO)

(72) Inventors: David Gustavo Lagarejo Lloreda, Pereira (CO); Javier Eduardo Hincapié Lenis, Pereira (CO)

(73) Assignee: ZION ING S.A.S., Pereira (CO)

(*) Notice: Subject to any disclaimer, the term of this patent is extended or adjusted under 35 U.S.C. 154(b) by 108 days.

(21) Appl. No.: 18/059,140

(22) Filed: Nov. 28, 2022

(65) Prior Publication Data

US 2024/0077174 A1   Mar. 7, 2024

(51) Int. Cl.
| | |
|---|---|
| *F16T 1/48* | (2006.01) |
| *G01M 3/32* | (2006.01) |
| *H04Q 9/00* | (2006.01) |
| *H04R 23/00* | (2006.01) |
| *H10N 10/13* | (2023.01) |

(52) U.S. Cl.
CPC .............. *F16T 1/48* (2013.01); *G01M 3/3263* (2013.01); *H04Q 9/00* (2013.01); *H04R 23/00* (2013.01); *H10N 10/13* (2023.02); *H04Q 2209/40* (2013.01); *H04Q 2209/84* (2013.01)

(58) Field of Classification Search
CPC .......... F16T 1/48; G01M 3/3263; H04Q 9/00; H04R 23/00; H10N 10/13
See application file for complete search history.

(56) References Cited

U.S. PATENT DOCUMENTS

| | | | | |
|---|---|---|---|---|
| 4,764,024 | A | * | 8/1988 | Ryan ....................... G01N 25/60 237/67 |
| 4,945,343 | A | * | 7/1990 | Rodriguez ................ F16T 1/48 137/185 |
| 2002/0124666 | A1 | | 9/2002 | Navarro et al. |
| 2007/0073495 | A1 | * | 3/2007 | Anderson .......... G05B 23/0232 702/50 |
| 2008/0150737 | A1 | * | 6/2008 | Karschnia ............. F22B 37/428 340/605 |
| 2019/0234826 | A1 | | 8/2019 | Isayev et al. |
| 2020/0263829 | A1 | * | 8/2020 | Owens ...................... F16T 1/48 |
| 2021/0033245 | A1 | * | 2/2021 | Wingerath .............. F01D 17/08 |
| 2021/0041383 | A1 | * | 2/2021 | Wentzloff .......... G05B 23/0235 |
| 2022/0404211 | A1 | * | 12/2022 | Lee .......................... G01K 7/00 |
| 2023/0147522 | A1 | * | 5/2023 | Alanazi ..................... F16T 1/48 700/47 |
| 2024/0044450 | A1 | * | 2/2024 | Uhlenbruck .............. F16T 1/48 |

FOREIGN PATENT DOCUMENTS

| | | |
|---|---|---|
| CN | 202546235 U | 11/2012 |
| CN | 210514974 U | 5/2020 |

\* cited by examiner

*Primary Examiner* — Eric S. McCall
(74) *Attorney, Agent, or Firm* — Dinsmore & Shohl LLP

(57) ABSTRACT

A system for real-time monitoring of steam lost from steam traps that integrates a series of sensors to measure pressure and temperature, configured to monitor leaks from any type of steam traps integrated to a wireless communication module that has a microcontroller and an algorithm specially developed for the control of such leaks by means of automatic machine learning.

10 Claims, 2 Drawing Sheets

SYSTEM AND METHOD FOR MONITORING AND CONTROL OF STEAM LOST FROM STEAM TRAPS

CROSS REFERENCE TO RELATED APPLICATION

The present application is filed under 35 U.S.C. § 119 and claims the priority of Columbian Patent Application No. NC2022/0007328, entitled "SISTEMA Y MÉTODO PARA MONITOREO Y CONTROL DEL VAPOR PERDIDO DE TRAMPAS DE VAPOR" and filed May 27, 2022, the entire contents of which are incorporated by reference herein.

TECHNICAL FIELD

The present disclosure relates to a system and method for real-time monitoring and control of the amount of steam lost from steam traps and automatic reporting of trap status.

BACKGROUND

Traditionally, steam trap inspection processes are performed manually, which represents safety risks, cost impact and reduction times. Some solutions exist on the market with these limitations, and also require batteries or other energy source that is not available without restrictions or correspond to manual measuring devices.

In turn, Patent CN202546235 shows an automatic trap monitoring system characterized by comprising a signal acquisition module arranged at an entry point of a steam trap. Said module comprises an ultrasonic detector and a transducer for measuring temperature. Although it shows that the trap has a management and analysis software, it does not show that it detects several types of faults that should cause a different type of alert. It also does not have a communication module at the trap outlet, so it is not possible to calculate the amount of vapor lost or to monitor the trap status.

On the other hand, application CN210514974 adds other communication elements in the monitoring system comprising a wireless module, a LoRa control and monitoring terminal, a router and a computer. The wireless sensor module includes an infrared temperature sensor and the controller transmits the data to the LoRa control terminal. However, this system only monitors temperature and not other variables, such as acoustic disturbances in the steam trap, nor does it report specific faults. It has no alternative communication models to the router so it is not a commercially viable alternative.

Additionally, application US20020124666 discloses a self-contained electronic system for instant monitoring of steam traps by multiple temperature and pressure, conductivity and ultrasonic sensors, has an electronic analyzer and a battery system charged with photovoltaic cells. Identification of the leaking steam trap is done by one or more of three types of information: visual, acoustic and numerical. However, it does not teach how to detect different types of faults according to flow rate and pressure differentials and requires batteries for its operation which increases investment and maintenance costs, as explained above.

Taking into account the known state of the art, it is necessary to provide a system for real-time monitoring of the amount of steam lost (leaks) in the steam traps that allows identifying different types of failures automatically and reproducibly, saving costs, especially in terms of energy costs.

SUMMARY

In order to address this problem, the present system has been developed for real-time monitoring of steam traps that integrates a series of sensors to measure pressure and temperature, configured to monitor leaks of any type of steam traps connected to a wireless communication module that has a microcontroller and an algorithm specially developed for the control of such leaks by means of automatic machine learning.

The sensors are preferably placed before and after of the steam trap, such as, for example, upstream and downstream of the steam trap. Such a placement allows for differential calculation of pressure and temperature variations. The two sensors measure the flow rate directly by means of an ultrasonic mechanism and then the pressure is calculated. The sensors can be placed directly in the pipe, and can further be removable or detachable. At least one of the sensors has an ultrasonic mechanism by which the pressure and temperature of the circulating fluid is calculated. In addition, another sensor is disposed directly in the trap, which also operates with ultrasound.

The wireless communication module is communicatively coupled to the sensors and includes a microcontroller that receives the measurements from the sensors and uses the algorithm to monitor even the smallest steam leakage, for example 0.1 kg per hour.

The data are processed by a specially designed algorithm stored in a non-transitory memory device and is executable by a processor (e.g., the microcontroller) that compares the condition of the current trap with a good condition standard using each of the detected variables (pressure, temperature, acoustic pattern), to first determine whether the fault is closed or open. The closed fault corresponds to a very particular and quick to identify state because the thermoelectric mechanism is kept in one position only (closed).

Also, another object of the present disclosure is the method of analysis and detection of leaks, which incorporates the execution of an algorithm (e.g., by a processor, such as the microcontroller), which is composed of two parts, the first to confirm the state of the trap (partial leak, flashing or fast leak, complete leak or closed failure), and the second part that allows to accurately estimate the amount of steam lost, temperature, pressure, $CO_2$ emitted and no longer emitted if an improvement were to be implemented.

Said method for real-time monitoring and control includes the following steps:

a. Collect the measured data from the acoustic pattern microphone at a certain instant of time.

b. Transfer such measured data to a microcontroller that has an algorithm stored thereon (e.g., in a non-transitory storage medium), the algorithm containing instructions that cause the microcontroller to convert the acoustic pattern to a frequency domain and compare the data with that of a good condition steam trap to make the initial calculation and classify the fault as open or closed.

c. Check, via programming provided by the algorithm, whether the state corresponds to an open fault based on the variables detected.

d. Check, via programming provided by the algorithm, whether the state corresponds to a closed fault based on the detected variables.

e. Check, via programming provided by the algorithm, if the state corresponds to a partial failure based on the detected variables.

f. Check, via programming provided by the algorithm, whether the state corresponds to a fast fault based on the detected variables.

g. Calculate the amount of steam lost, the amount of gases emitted or saved.

h. Report trap status in real time to a platform or storage unit.

In addition, between step f and g, the data of pressures and temperature are collected for the calculation of the lost steam.

DETAILED DESCRIPTION

Figure 1:
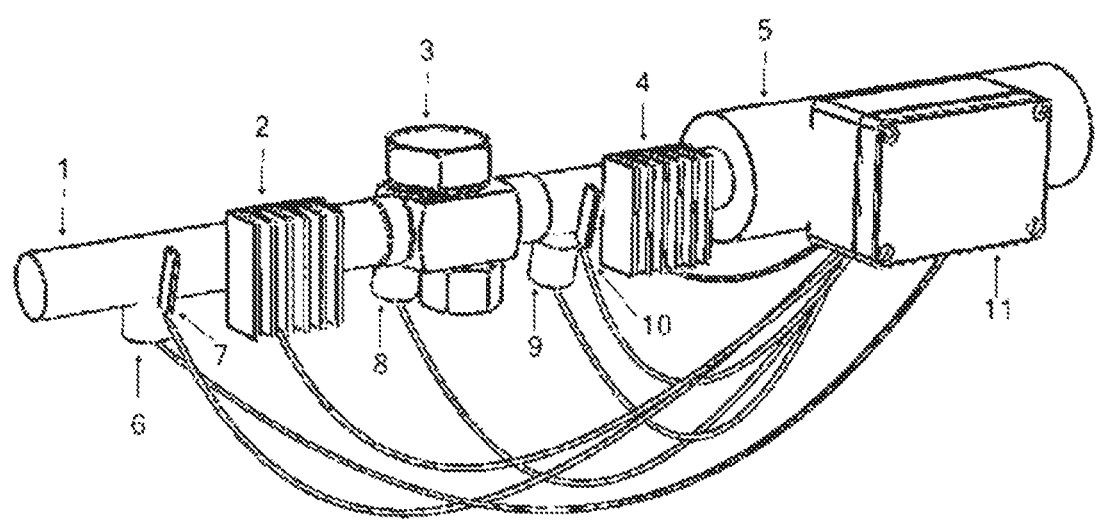
FIG. 1 depicts a perspective view of a monitoring device installed in a pipeline with the insulation removed according to one or more embodiments shown and described herein. The connection module is also installable in the pipeline, but can also be used outside the pipeline.
Figure 2:
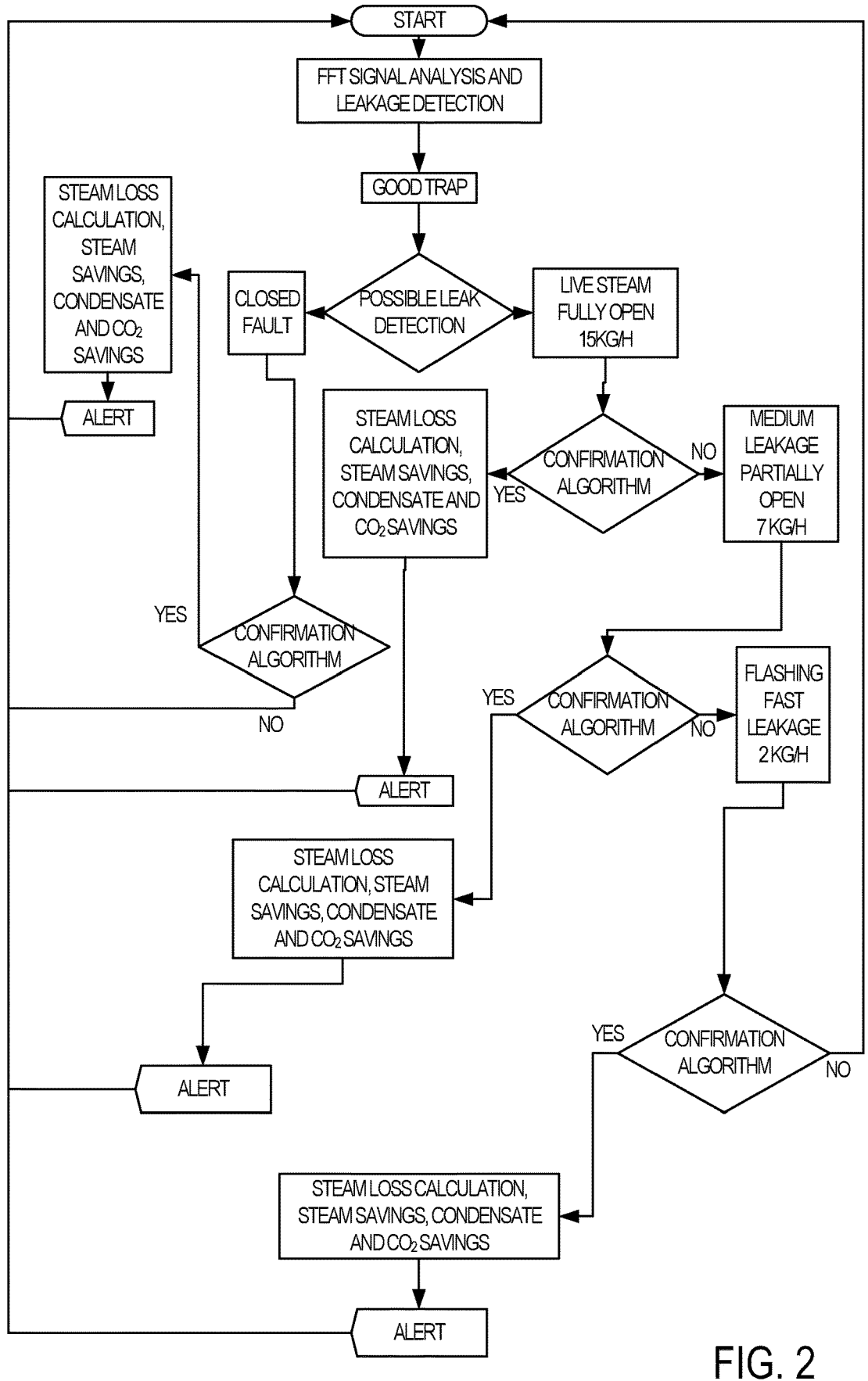
FIG. 2 depicts a flow diagram for an illustrative method of detecting the trap status, in which alerts are generated in case a failure is found, according to one or more embodiments shown and described herein.

The system for real-time monitoring of steam losses in at least one steam trap (3), allows detecting quick leaks or partial leaks, e.g. it measures the mass quantity or volume of steam lost per trap, which then makes it possible to know the efficiency percentage and to know the state of the trap, to schedule maintenance or to anticipate a failure, as well as to project the steam lost per hour and to know how much steam is emitted into the atmosphere, together with other gases, such as carbon dioxide.

Said system is installable and removable directly on a ½" to 10" (1.27 cm to 25.4 cm) pipe (1), made of any type of material, metallic or plastic, such as carbon steel, stainless steel, copper, aluminum and plastics such as PVC. Preferably, the device is installed by removing the thermal insulation (5) normally used in steam piping. The steam trap (3) can be thermodynamic, mechanical or thermostatic.

The ultrasonic sensors (6, 9) and the temperature sensors (7, 10) are connected via a cable to the connection module (11) containing the microcontroller for capturing and processing the collected data. This data is sent wirelessly to the main receiving and storage unit, preferably via the LoraWan protocol to a main gateway.

Specifically, the two ultrasonic sensors (6, 9), correspond to sensors used for pressure detection. One ultrasonic sensor (6) is placed before or upstream of the inlet of the steam trap (3) and the other ultrasonic sensor (9) is placed downstream or after the steam trap (3) to monitor pressure variations. A temperature sensor (7) and a corresponding thermoelectric generator (2) are arranged before or upstream of the steam trap inlet, while another temperature sensor (10) and corresponding thermoelectric generator (4) are arranged downstream of the steam trap outlet.

In addition, the device comprises the thermoelectric generator (2) at the inlet of the steam trap (3) and the other thermoelectric generator (4) at the outlet of the steam trap (3). These devices make it possible to generate energy through the temperature difference, under the Peltier effect. The devices (2, 4) are used because the traps are located in places with little electrical connection and because of the temperature, cables that resist high temperatures are necessary. Therefore, the device of the present disclosure that does not require batteries, which helps to save costs and time in the replacement of batteries and increase the durability of the equipment, which is usually at least about 5 years, for example.

At least one ultrasonic microphone (8) located directly on the steam trap (3), monitors by means of a high frequency ultrasonic detection the acoustic pattern of the trap, in order to detect any type of disturbance. This is advantageously located in the upper part of the trap, where it is possible to obtain the best measurement of the acoustic pattern, fastened by using a metal clamp, flange, tie or any other fastening element that allows holding the sensor. This sensor, like the others, sends the information to the main microcontroller wirelessly by means of WiFi, 3G/4G protocols or preferably by means of the Lora protocol.

All sensors and microcontrollers, the power system and the LoraWan communication are inside a custom-made box.

The sensors, microcontroller and LoraWan communication protocol are powered using thermoelectric generators that include Peltier cells. The Peltier cells are connected around the pipeline to take advantage of the thermal differential that can exceed temperatures of about 80° C. and generate electrical power. These devices are connected at the output to a commercial regulator that powers the microcontrollers that in turn power the sensors.

The microcontroller contains a processor and non-transitory memory containing an algorithm that reports the faults found in the received variables of temperature before and after the trap, pressure before and after the trap, and acoustic pattern in the trap. To start, the programming instructions according to the algorithm cause the processor to convert the acoustic pattern to the frequency domain by doing the fast Fourier transform and then compare the trap data with that of a good trap to make an initial calculation to know if the trap is in open or closed fault.

A confirmation algorithm contained in the memory causes the processor to perform a plurality of comparisons of each of the variables to first determine whether the fault is closed or open. The closed fault corresponds to a very particular and quick to identify state because the thermoelectric mechanism is held in one position only (closed).

If this particular closed fault condition is not detected, the processor (via the algorithm) re-compares the data from the good condition trap with the data from the open condition trap (corresponds to 15 kg/h of steam lost) using the detected variables. If the confirmation algorithm contained in the memory causes the processor to verify that the fault is open, then the processor (via the algorithm) calculates the amount of steam lost using the well-known Manonelian formula (highly accurate formula for calculating the amount of steam lost in steam traps), the $CO_2$ emitted and not emitted and reports the trap status.

On the other hand, if the processor does not detect the failure in the open state, then the processor proceeds to check if the failure is partial (corresponds to 7 kg/h of steam lost) by comparing the data of the trap in good condition with the data of the trap in partial failure state using the detected variables. If the processor verifies (via confirmation algorithm) that the failure is partial, then the processor calculates the amount of steam lost using the Masoneilan formula (a highly accurate formula for calculating the amount of steam lost in steam traps), the $CO_2$ emitted and not emitted and reports the trap status.

Finally, if the partial state failure is not detected, then the processor proceeds to check if the failure is fast or flashing (corresponds to 2 kg/h of steam lost) by comparing the data from the trap in good condition with the data from the trap in fast failure state using the detected variables. If the processor verifies that the failure is fast, then the processor calculates the amount of steam lost using the Masoneilan formula (a highly accurate formula for calculating the amount of steam lost in steam traps), the $CO_2$ emitted and not emitted and reports the trap status.

If, after executing processes according to all of the confirmation algorithms and the system does not detect any difference with a trap in good condition, then the processor reports as a trap in good condition. This evaluation occurs in real time, e.g., every certain period of time, programmed by a user, e.g., every 5, 10, 15, 20, 25, 30, 35, 40, 45, 50 s or every min, depending on the needs of the process, and displays the data on a customized platform for each user to monitor the status of the trap.

An advantage of the device disclosed herein is that the device works in a non-invasive way. That is, it is not required to turn off the steam boiler, nor does it require any type of batteries or solar energy, since it works by extracting thermal energy from the pipeline. The device described herein is designed to operate 24 hours a day, 365 days a year in any type of industrial environment (including the Oil and Gas sector) from half-inch pipe made of any material. No need to change steam trap, as the device described herein works with all types of steam traps.

The method according to the present disclosure calculates the steam lost by Masoneilan's formula, which is the most accurate and accepted. By obtaining this data, it is possible to calculate the $CO_2$ emissions and the amount of lost steam cost due to not changing the trap.

Although both the present disclosure and its advantages have been described in sufficient detail, it should be understood that changes, substitutions, alterations can be made without departing from the spirit and scope of the present disclosure, which is defined by the following claims.

What is claimed is:

1. A system for real-time monitoring and control of steam lost from steam traps, the system comprising:
    at least two ultrasonic sensors for pressure measurement;
    at least two temperature sensors;
    a steam trap;
    at least one ultrasonic microphone positioned in contact with the steam trap; and
    a connection module connected to the at least two ultrasonic sensors and the at least one ultrasonic microphone, the connection module comprising a microcontroller and a wireless communication module,
    wherein the microcontroller is configured to:
        analyze a signal from detected variables received by the at least two ultrasonic sensors,
        check a trap status and calculate an amount of steam lost,
        diagnose whether the steam trap has any type of leak or fault selected from a closed fault, an open fault, a partial leak, or a fast leak, and
        report on a platform every certain period of time according to steam trap specifications and the trap status.

2. The system according to claim 1, wherein the at least two ultrasonic sensors and the at least two temperature sensors are located before and after the steam trap in a flow direction, allowing differential calculation of pressure and temperature variations.

3. The system according to claim 1, wherein the at least two ultrasonic sensors are removably or detachably connected to a pipeline containing the steam trap.

4. The system according to claim 3, wherein the at least two ultrasonic sensors are installed with an insulation layer removed that normally covers steam pipes of nominal diameter between ½ inches to 10 inches (1.27 cm to 25.4 cm).

5. The system according to claim 1, wherein the wireless communication module is selected from WiFi, 3G/4G, or Lora.

6. The system according to claim 1, wherein real-time data is reported on the platform according to user specifications.

7. The system according to claim 1, further comprising at least one first electrical generator at an inlet of the steam trap and at least one second electrical generator at an outlet of the steam trap.

8. The system according to claim 7, wherein the at least one first electrical generator and/or the at least one second electrical generator includes Peltier cells to generate necessary electrical power by harnessing a thermal difference.

9. A method for real-time monitoring and control of steam lost from steam traps, the method comprising:
    collecting measured data from an ultrasonic microphone at a certain instant of time;
    transferring the measured data to a microcontroller that is programmed via an algorithm to convert the measured data from the ultrasonic microphone to a frequency domain and compare data with that of a good condition steam trap to make an initial calculation and classify a fault as open or closed;
    checking whether a state corresponds to an open fault based on detected variables;
    checking whether the state corresponds to a closed fault based on the detected variables;
    checking if the state corresponds to a partial failure based on the detected variables;
    checking whether the state corresponds to a fast fault based on the detected variables;
    calculating an amount of steam lost and an amount of gases emitted or saved; and
    reporting trap status in real time to a platform or storage unit.

10. The method according to claim 9, wherein between checking whether the state corresponds to the fast fault and calculating the amount of steam lost and the amount of gases emitted or saved, collecting data of pressures and temperature for the calculation of the amount of steam lost.

\* \* \* \* \*